(12) United States Patent
Geng et al.

(10) Patent No.: US 11,172,464 B2
(45) Date of Patent: Nov. 9, 2021

(54) COMMUNICATION METHOD AND RELATED APPARATUS

(71) Applicant: Huawei Technologies Co., Ltd., Shenzhen (CN)

(72) Inventors: Tingting Geng, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/521,044

(22) Filed: Jul. 24, 2019

(65) Prior Publication Data

US 2019/0349887 A1 Nov. 14, 2019

Related U.S. Application Data

(63) Continuation of application No. PCT/CN2018/073751, filed on Jan. 23, 2018.

(30) Foreign Application Priority Data

Jan. 26, 2017 (CN) .......................... 201710057318.7

(51) Int. Cl.
*H04L 5/00* (2006.01)
*H04W 68/02* (2009.01)
(Continued)

(52) U.S. Cl.
CPC ........... *H04W 68/02* (2013.01); *H04L 5/0005* (2013.01); *H04W 72/0453* (2013.01); *H04W 74/0833* (2013.01); *H04W 76/11* (2018.02)

(58) Field of Classification Search
CPC . H04W 68/02; H04W 76/11; H04W 72/0453; H04W 74/0833; H04L 5/0005
See application file for complete search history.

(56) References Cited

U.S. PATENT DOCUMENTS

| 10,542,531 | B2 * | 1/2020 | Kim .................... H04W 72/042 |
| 2011/0122825 | A1 * | 5/2011 | Lee ..................... H04J 11/0069 |
| | | | 370/328 |

(Continued)

FOREIGN PATENT DOCUMENTS

| CN | 101060713 A | 10/2007 |
| CN | 101128027 A | 2/2008 |

(Continued)

OTHER PUBLICATIONS

"NR DL Control Channel Structure," Agenda Item: 7.1.4.1, Source: CATT, Docments for: Discussion and Decision, 3GPP TSG RSN WG1 Meeting #87, R1-1611390, Nov. 14-18, 2016, 4 pages.

(Continued)

*Primary Examiner* — Jaison Joseph
(74) *Attorney, Agent, or Firm* — Slater Matsil, LLP (57) ABSTRACT

A communication method and a related apparatus, method including determining, by a network device, a first subband on which first downlink control information is located, where a bandwidth of the first subband is less than a system bandwidth used for communication between the network device and a terminal, sending, by the network device, the first downlink control information on the first subband, determining, by the terminal, the first subband on which the first downlink control information is located, and receiving, by the terminal, the first downlink control information on the first subband.

17 Claims, 5 Drawing Sheets

(51) Int. Cl.
*H04W 76/11* (2018.01)
*H04W 72/04* (2009.01)
*H04W 74/08* (2009.01)

(56) References Cited

U.S. PATENT DOCUMENTS

| | | | | |
|---|---|---|---|---|
| 2014/0302855 | A1* | 10/2014 | Nory | H04W 52/0206 455/437 |
| 2014/0302887 | A1* | 10/2014 | Bashar | H04L 67/1076 455/550.1 |
| 2015/0223213 | A1 | 8/2015 | Moon et al. | |
| 2015/0304821 | A1* | 10/2015 | Liu | H04W 72/1278 370/312 |
| 2016/0088594 | A1* | 3/2016 | Xiong | H04W 4/70 370/329 |
| 2017/0127381 | A1* | 5/2017 | Yavus | H04W 4/70 |
| 2017/0332365 | A1* | 11/2017 | Lin | H04W 72/0406 |
| 2018/0063818 | A1* | 3/2018 | Chen | H04W 74/0833 |
| 2019/0215799 | A1* | 7/2019 | Fard | H04W 68/005 |

FOREIGN PATENT DOCUMENTS

| | | |
|---|---|---|
| CN | 101202578 A | 6/2008 |
| CN | 101432992 A | 5/2009 |
| CN | 101516136 A | 8/2009 |
| CN | 102300267 A | 12/2011 |
| CN | 102316535 A | 1/2012 |
| CN | 103220795 A | 7/2013 |
| CN | 103220796 A | 7/2013 |
| CN | 103458509 A | 12/2013 |
| CN | 103582097 A | 2/2014 |
| CN | 104254120 A | 12/2014 |
| CN | 105099639 A | 11/2015 |
| CN | 105580487 A | 5/2016 |
| CN | 105813203 A | 7/2016 |
| EP | 3200495 A1 | 8/2017 |
| EP | 3209050 A1 | 8/2017 |
| WO | 2013165572 A1 | 11/2013 |
| WO | 2014209035 A1 | 12/2014 |
| WO | 2016070424 A1 | 5/2016 |
| WO | 2016070429 A1 | 5/2016 |

OTHER PUBLICATIONS

"Common Control Signaling for NR," Source: CATT, Agenda Item: 7.1.4.1, Document for: Discussion and Decision, 3GPP TSG RAN WG1 Meeting #87, R1-1611391, Nov. 14-18, 2016, 4 pages.
"On UE-specific Bandwidth Adaptation for Single Carrier Operation," Agenda Item: 7.1.1, Source: MediaTek Inc., Document for: Discussion, 3GPP TSG RAN WG1 Meeting #87, R1-1612119, Reno, USA, Nov. 14-18, 2016, 5 pages.

* cited by examiner

COMMUNICATION METHOD AND RELATED APPARATUS

CROSS-REFERENCE TO RELATED APPLICATIONS

This application is a continuation of International Application No. PCT/CN2018/073751, filed on Jan. 23, 2018, which claims priority to Chinese Patent Application No. 201710057318.7, filed on Jan. 26, 2017. The disclosures of the aforementioned applications are hereby incorporated by reference in their entireties.

TECHNICAL FIELD

This application relates to the communications field, and more specifically, to a communication method and a related apparatus.

BACKGROUND

In a communications network, before sending a paging message to a terminal, a network device sends control information for assisting the terminal in receiving the paging message, such as information about a time domain location or a frequency domain location for sending the paging message. After receiving the control information, the terminal may receive the paging information according to an instruction of the control information.

In a conventional communication method, the terminal searches for the control information on an entire bandwidth, and this leads to high energy consumption of the terminal.

SUMMARY

This application provides a communication method and a related apparatus, so as to reduce energy consumption of a terminal.

According to a first aspect, an embodiment of this application provides a communication method. The communication method includes determining, by a terminal, a first subband on which first downlink control information is located, where a bandwidth of the first subband is less than a system bandwidth used for communication between a network device and the terminal, and receiving, by the terminal, the first downlink control information on the first subband.

In the communication method, a bandwidth of a subband used by the terminal to receive the first downlink control information is less than the system bandwidth, so that the terminal can receive the first downlink control information in a frequency band with a smaller bandwidth, thereby reducing time used by the terminal to receive the first downlink control information, and further reducing energy consumption of the terminal.

With reference to the first aspect, in a first possible implementation, the determining, by a terminal, a first subband on which first downlink control information is located includes determining, by the terminal based on an index of the first subband, a frequency band on which the first subband is located.

With reference to the first possible implementation, in a second possible implementation, the communication method further includes receiving, by the terminal, configuration information of the first subband, where the configuration information of the first subband includes a subband quantity of the system bandwidth, and determining, by the terminal, the index of the first subband based on an identifier of the terminal and the subband quantity.

In this implementation, the terminal determines the index of the first subband and the bandwidth of the first subband based on the subband quantity in the configuration information of the first subband, so that the frequency band of the first subband can be further determined, and the terminal can receive the first downlink control information on a corresponding subband according to an instruction of the network device, thereby improving communication flexibility.

With reference to the first possible implementation, in a third possible implementation, the communication method further includes receiving, by the terminal, configuration information of the first subband, where the configuration information of the first subband includes a subband bandwidth of the system bandwidth, determining, by the terminal, a subband quantity of the system bandwidth based on the system bandwidth and the subband bandwidth, and determining, by the terminal, the index of the first subband based on an identifier of the terminal and the subband quantity.

In this implementation, the terminal determines the subband quantity based on the subband bandwidth in the configuration information of the first subband, so that the frequency band of the first subband can be further determined, and the terminal can receive the first downlink control information on a corresponding subband according to an instruction of the network device, thereby improving communication flexibility.

With reference to any one of the first aspect or the first to the third possible implementations, in a fourth possible implementation, the receiving, by the terminal, the first downlink control information on the first subband includes determining, by the terminal based on the bandwidth of the first subband, a first search space for receiving the first downlink control information on the first subband, and receiving, by the terminal, the first downlink control information in the first search space.

With reference to any one of the first aspect or the first to the fourth possible implementations, in a fifth possible implementation, the first downlink control information includes first instruction information, and the first instruction information is used to instruct the terminal to receive at least one of the following messages: a paging message, a system message, or a random access response message.

With reference to the fifth possible implementation, in a sixth possible implementation, the first downlink control information further includes location indication information, and the location indication information is used to indicate a time domain location and/or a frequency domain location of the at least one message on the first subband.

With reference to the first aspect, in a seventh possible implementation, the communication method further includes receiving, by the terminal, a paging message, a system message, a radio resource control message, or a random access response message, where the paging message, the system message, the radio resource control message, or the random access response message carries configuration information of the first subband, the configuration information of the first subband is used to instruct the terminal to receive the first downlink control information on the first subband, and the determining, by a terminal, a first subband on which first downlink control information is located includes determining, by the terminal based on the configuration information of first subband, the first subband on which the first downlink control information is located.

In this possible implementation, when transmitting downlink control information of too many terminals on the first subband, the network device may adjust the terminals in time to another subband, to avoid paging congestion and congestion of the random access response or another downlink response.

According to a second aspect, an embodiment of this application provides a communication method. The communication method includes determining, by a network device, a first subband on which first downlink control information is located, where a bandwidth of the first subband is less than a system bandwidth used for communication between the network device and a terminal, and sending, by the network device, the first downlink control information on the first subband.

In the communication method, a bandwidth of a subband used by the network device to send the first downlink control information is less than the system bandwidth, so that the terminal can receive the first downlink control information in a frequency band with a smaller bandwidth, thereby reducing time used by the terminal to receive the first downlink control information, and further reducing energy consumption of the terminal.

With reference to the second aspect, in a first possible implementation, the determining, by a network device, a first subband on which first downlink control information is located includes determining, by the network device based on an index of the first subband, a frequency band on which the first subband is located.

With reference to the first possible implementation, in a second possible implementation, the communication method further includes sending, by the network device, configuration information of the first subband, where the configuration information of the first subband includes a subband quantity of the system bandwidth.

In this implementation, the network device sends the configuration information of the first subband, so that the terminal can determine the index of the first subband and the bandwidth of the first subband based on the subband quantity in the configuration information of the first subband, to further determine the frequency band of the first subband, so that the terminal can receive the first downlink control information on a corresponding subband according to an instruction of the network device, thereby improving communication flexibility.

With reference to the first possible implementation, in a third possible implementation, the communication method further includes sending, by the network device, configuration information of the first subband, where the configuration information of the first subband includes a subband bandwidth of the system bandwidth.

In this implementation, the network device sends the configuration information of the first subband, so that the terminal can determine a subband quantity based on the subband bandwidth in the configuration information of the first subband, to further determine the frequency band of the first subband, so that the terminal can receive the first downlink control information on a corresponding subband according to an instruction of the network device, thereby improving communication flexibility.

With reference to any one of the second aspect or the first to the third possible implementations, in a fourth possible implementation, the sending, by the network device, the first downlink control information on the first subband includes determining, by the network device based on the bandwidth of the first subband, a first search space for sending the first downlink control information on the first subband, and sending, by the network device, the first downlink control information in the first search space.

With reference to any one of the second aspect or the first to the fourth possible implementations, in a fifth possible implementation, the first downlink control information includes first instruction information, and the first instruction information is used to instruct the terminal to receive at least one of the following messages: a paging message, a system message, or a random access response message.

With reference to the fifth possible implementation, in a sixth possible implementation, the first downlink control information further includes location indication information, and the location indication information is used to indicate a time domain location and/or a frequency domain location of the at least one message on the first subband.

With reference to the second aspect, in a seventh possible implementation, the communication method further includes sending, by the network device, a paging message, a system message, a radio resource control message, or a random access response message, where the paging message, the system message, the radio resource control message, or the random access response message carries configuration information of the first subband, and the configuration information of the first subband is used to instruct the terminal to receive the first downlink control information on the first subband.

In this possible implementation, when transmitting downlink control information of too many terminals on the first subband, the network device may adjust the terminals in time to another subband, to avoid paging congestion and congestion of the random access response or another downlink response.

According to a third aspect, an embodiment of this application provides a terminal, and the terminal includes a module configured to perform the communication method in the first aspect or any one of the possible implementations in the first aspect.

According to a fourth aspect, an embodiment of this application provides a network device, and the network device includes a module configured to perform the communication method in the second aspect or any one of the possible implementations in the second aspect.

According to a fifth aspect, an embodiment of this application provides a terminal, including a processor and a receiver, where the receiver and the processor are configured to implement the communication method in the first aspect or any one of the possible implementations in the first aspect.

According to a sixth aspect, an embodiment of this application provides a network device, including a processor and a transmitter, where the transmitter and the processor are configured to implement the communication method in the second aspect or any one of the possible implementations in the second aspect.

According to a seventh aspect, an embodiment of this application provides a computer readable medium, where the computer readable medium stores program code executed by a terminal, and the program code includes an instruction for performing the communication method in the first aspect or any one of the possible implementations in the first aspect.

According to an eighth aspect, an embodiment of this application provides a computer readable medium, where the computer readable medium stores program code executed by a network device, and the program code includes an instruction for performing the communication method in the second aspect or any one of the possible implementations in the second aspect.

According to a ninth aspect, an embodiment of this application provides a computer program product including an instruction, and when the computer program product runs on a terminal, the terminal performs the communication method in the first aspect or any one of the possible implementations in the first aspect.

According to a tenth aspect, an embodiment of this application provides a computer program product including an instruction, and when the computer program product runs on a network device, the network device performs the communication method in the second aspect or any one of the possible implementations in the second aspect.

DETAILED DESCRIPTION OF ILLUSTRATIVE EMBODIMENTS

The following describes technical solutions of this application with reference to accompanying drawings.

Figure 1:
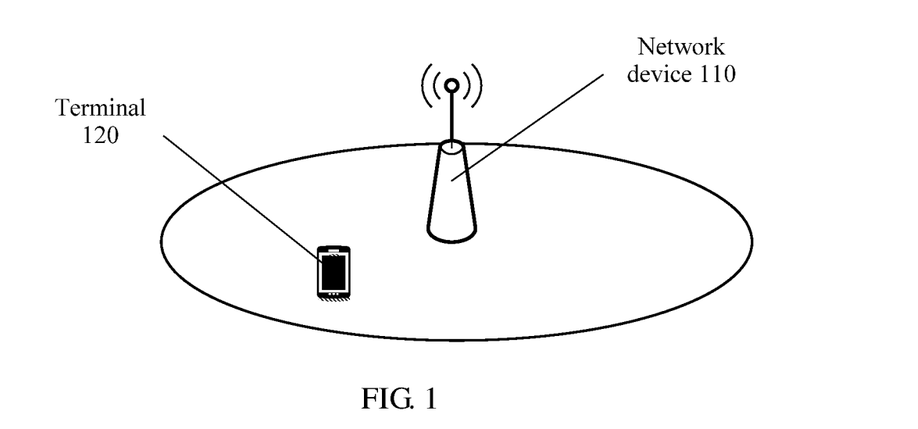
FIG. 1 is a schematic structural diagram of a communications system to which a communication method, a terminal, and a network device according to an embodiment of this application can be applied.

A schematic structural diagram of a communications system to which a communication method, a terminal, and a network device according to embodiments of this application can be applied is shown in FIG. 1. It should be understood that the embodiments of this application are not limited to a system architecture shown in FIG. 1. In addition, an apparatus in FIG. 1 may be hardware, functionally divided software, or a combination of the hardware and the software.

It can be learned from FIG. 1 that the communications system to which the communication method according to the embodiments of this application can be applied may include a network device no and a terminal 120.

In a possible implementation, the network device no may be a base station. It should be understood that a specific type of the base station is not limited in the embodiments of this application. In systems using different radio access technologies, names of devices having functions of the base station may vary. For ease of description, in all the embodiments of this application, the apparatuses that provide a wireless communication function for the terminal are collectively referred to as a base station, such as a base station device and a small base station device (Pico) in a future network.

The terminal 120 may be user equipment (UE), and the UE may communicate with one or more core networks (CN) by using a radio access network (RAN). The UE may be referred to as an access terminal, a terminal device, a subscriber unit, a subscriber station, a mobile station, a mobile console, a remote station, a remote terminal, a mobile device, a user terminal, a wireless communications device, a user agent, or a user apparatus. The UE may be a cellular phone, a cordless phone, a Session Initiation Protocol (SIP) phone, a wireless local loop (WLL) station, a personal digital assistant (PDA), a handheld device having a wireless communication function, a computing device or another device connected to a wireless modem, a vehicle-mounted device, a wearable device or a terminal device in Internet of Things and Internet of Vehicles, any form of terminal device in a future network, and the like.

The network device no may communicate with the terminal 120 on a frequency band specified in a communications standard. The frequency band refers to specific frequency range information, such as 890 M to 910 M, where 890 M may be referred to as a lower boundary of the frequency band, and 910 M may be referred to as an upper boundary of the frequency band.

An absolute value of a difference between the upper boundary and the lower boundary of the frequency band may be referred to as a bandwidth. A bandwidth of a maximum frequency band (which may be referred to as a system frequency band) that may be used for communication between the network device no and the terminal 120 may be referred to as a system bandwidth.

A system bandwidth on the network device and/or information about a frequency band on which the system bandwidth is located may be configured according to a communications standard. A system bandwidth on the terminal and/or information about a frequency band on which the system bandwidth is located may be configured according to a communications standard, or may be configured based on a system message sent by the network device. The system message may carry the system bandwidth and/or the information about the frequency band on which the system bandwidth is located.

The system bandwidth may be divided into a plurality of subbands, and a bandwidth of each subband may be referred to as a subband bandwidth. A total quantity of all subbands included in the system bandwidth may be referred to as a subband quantity.

The system bandwidth may be divided into a plurality of equal-bandwidth subbands or subbands with different bandwidths.

For example, the system frequency band is 890 M to 910 M, the system bandwidth is 20 M, the system bandwidth may be divided into four equal-bandwidth subbands, and a bandwidth of each subband is 5 M. When an upper boundary of the system frequency band is used as a calculation start point, a frequency band on which one of the subbands is located is 905 M to 910 M.

The network device 110 and the terminal 120 may communicate with each other on a subband included in the system bandwidth, or on a frequency band corresponding to the subband.

Figure 2:
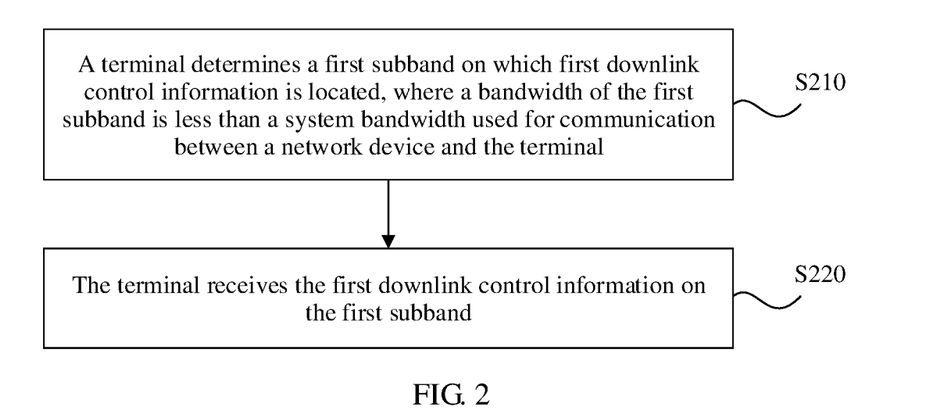
FIG. 2 is a schematic flowchart of a communication method according to an embodiment of this application.

FIG. 2 is a schematic flowchart of a communication method according to an embodiment of this application. It should be understood that FIG. 2 shows steps or operations of the communication method, but these steps or operations are merely examples. In this embodiment of this application, other operations or variations of the operations in FIG. 2 may be further performed. In addition, the steps in FIG. 2 may be performed in a sequence different from that shown in FIG. 2, and it is possible that not all of the operations in FIG. 2 need to be performed.

S210. A terminal determines a first subband on which first downlink control information is located, where a bandwidth of the first subband is less than a system bandwidth used for communication between a network device and the terminal.

That is, the terminal determines a subband on which the network device sends the first downlink control information to the terminal. In this embodiment of this application, a subband used by the network device to send the first downlink control information to the terminal is referred to as the first subband.

The bandwidth of the subband, namely, the first subband used by the network device to send the first downlink control information to the terminal is less than the system bandwidth, so that the terminal can receive the first downlink control information in a frequency band less than the system bandwidth, thereby reducing an operating bandwidth used by the terminal to receive the first downlink control information, and further reducing energy consumption of the terminal.

That a terminal determines a first subband on which first downlink control information is located may include the following. The terminal determines a frequency band of the first subband on which the first downlink control information is located.

When the terminal determines the frequency band of the first subband on which the first downlink control information is located, a first possible implementation includes the following. The terminal has configuration information, and the configuration information is used to configure a sub-frequency-band of the system bandwidth as the frequency band of the first subband, and the terminal determines the frequency band of the first subband based on the configuration information. The first possible implementation may further include the following. The configuration information may be received by the terminal from the network device.

To be specific, configuration information about on which frequency band the first downlink control information is transmitted may be configured on the terminal, and the frequency band is a frequency subband in a system frequency band. In this way, the terminal may determine, based on the configuration information, the frequency band on which the first downlink control information is located, namely, the frequency band of the first subband.

For example, the system bandwidth may be divided into subbands of high, medium, and low three frequency bands. The configuration information on the terminal may include the following information. A high-frequency subband or an intermediate-frequency subband or a low-frequency subband of the system bandwidth is a default first subband. Alternatively, the configuration information on the terminal may include the following information. A high frequency band or an intermediate frequency band or a low frequency band in the system frequency band is the frequency band on which the first subband is located. In this way, the terminal may determine the frequency band of the first subband based on the configuration information.

Figure 3:
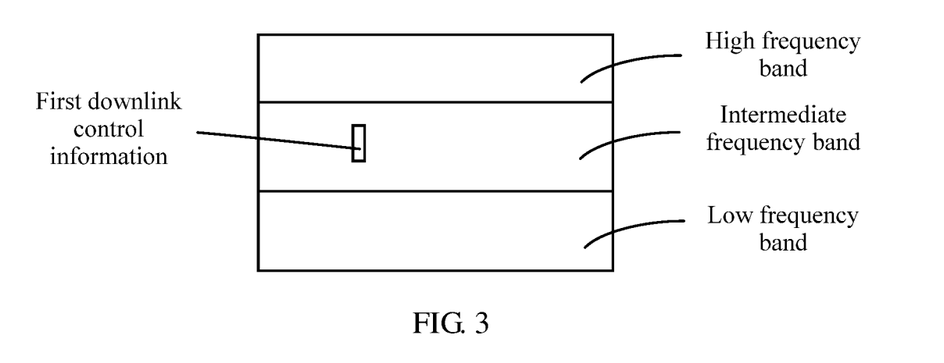
FIG. 3 is a schematic diagram of a spectrum of a first subband according to an embodiment of this application.

As shown in FIG. 3, the system frequency band is 890 M to 910 M, the system bandwidth is 20 M, and the configuration information on the terminal is used to configure the intermediate frequency band of the system bandwidth as the first subband. In this case, the bandwidth of the first subband is 10 M, and the frequency band is 895 M to 905 M.

When the terminal determines the frequency band of the first subband on which the first downlink control information is located, a second possible implementation includes the following. A frequency band of each subband of the system bandwidth is configured on the terminal, sequence numbers of a plurality of subbands of the system bandwidth correspond to indexes of the subbands, and an index of the first subband may indicate a location of the first subband in the plurality of subbands in configuration information of the first subband, so that the bandwidth of the first subband can be determined.

In this possible implementation, the terminal determines the index of the first subband first, and then determines the frequency band of the first subband based on the index of the first subband.

When the terminal determines the frequency band of the first subband on which the first downlink control information is located, a third possible implementation includes the following. The terminal may receive a correspondence, sent by the network device, between an index of each subband of the system bandwidth and a frequency band, and the terminal finds, based on the index of the first subband, a sub-frequency-band corresponding to the index of the first subband, to obtain the frequency band of the first subband.

This possible implementation is different from the second possible implementation in that the index of each sub-frequency-band is not implied in an arrangement sequence of subbands, but each sub-frequency-band has a corresponding explicit index. Similarly, the terminal also determines the index of the first subband first, and then determines the frequency band of the first subband based on the index of the first subband.

When the terminal determines the frequency band of the first subband on which the first downlink control information is located, a fourth possible implementation includes the following. The terminal determines, based on the index of the first subband and the bandwidth of the first subband, the frequency band on which the first subband is located.

In this possible implementation, the terminal needs to determine the index of the first subband and the bandwidth of the first subband.

The following describes possible specific implementations when the terminal determines the index of the first subband.

In the foregoing possible implementations, when the terminal determines the index of the first subband, a first manner may include the following. The terminal receives configuration information that is of the first subband and that is sent by the network device, where the configuration information of the first subband includes the index of the first subband.

When the terminal determines the index of the first subband, a second manner may include the following. The terminal determines the index of the first subband based on an identifier of the terminal.

That the terminal determines the index of the first subband based on an identifier of the terminal may include the following. The terminal determines the index of the first subband based on the identifier of the terminal and a subband quantity of the system bandwidth.

The identifier of the terminal may be inherent to the terminal, such as an international mobile subscriber identity (International Mobile Subscriber Identity, IMSI). Because the identifier is random, the index of the first subband determined by using the identifier of the terminal and the subband quantity is also random, and an effect of evenly distributing terminals in a subband can be achieved.

The identifier of the terminal may be allocated by the network device, such as a system architecture evolution temporary mobile subscriber identity (S-TMSI), a radio access network resume identity (RAN resume ID), a dedicated connection identity (DCID), a cell radio network temporary identity (C-RNTI), or a temporary cell radio network temporary identity (TC-RNTI). The network device may selectively configure the identifier of the terminal based on the bandwidth or the frequency band of each subband. Therefore, a quantity, determined based on the identifier of the terminal and the subband quantity, of terminals in each subband has a proportional relationship with the bandwidth or the frequency band of the subband, and the network device may flexibly control distribution, between the subbands, of the first downlink control information sent to the terminal.

In a possible method, the terminal may take an obtained modulus value after the identifier of the terminal mod the subband quantity of the system bandwidth, as the index of the first subband. For example, if the identifier of the terminal is UE_ID, the subband quantity is N, and the index of the first subband is subBand Index, subBand Index=UE_ID mod N.

It should be understood that the formula for calculating the index of the first subband is merely an example. In this embodiment of this application, the index of the first subband may be alternatively determined based on the identifier of the terminal and the subband quantity in another manner. For example, the identifier of the terminal may be processed to reduce an order of magnitude of the identifier of the terminal, and then the index of the first subband is calculated based on the formula. For example, the UE_ID may mod 1024 first, and then mod the subband quantity to obtain the index of the first subband.

Optionally, the terminal may further determine the index of the first subband with reference to another parameter, such as a subcarrier spacing or an index offset.

For example, the configuration information that is of the first subband and that is received by the terminal may further include an index offset. After determining an initial index, for example, determining the initial index based on the identifier of the terminal and the subband quantity, the terminal may add the index offset value to the initial index, to obtain the index of the first subband.

The terminal determines the index of the first subband based on the index offset, so that when a subband carries too much downlink control information or too many paging messages, random access response messages, or other downlink response messages of another terminal, the terminal may still receive the downlink control information of the terminal in time in a search space on another subband.

The identifier of the terminal may be obtained from configuration information sent by the network device, or may be an inherent identifier of the terminal, or may be obtained from configuration information sent by a core network device.

The identifier of the terminal is used to uniquely identify the terminal in a cell, or uniquely identify the terminal in a plurality of cells or in a paging area, or uniquely identify the terminal in a core network range, or uniquely identify the terminal in an entire communications network.

If the terminal is in an inactive (inactive) state, namely, a third state, or in an active (active) state, the identifier of the terminal may be at least one of a radio access network resume identity (RAN resume ID), a dedicated connection identity (Dedicated Connection Identity, DCID), a cell radio network temporary identity (Cell Radio Network Temporary Identity, C-RNTI), a temporary cell radio network temporary identity (Temporary Cell Radio Network Temporary Identity, TC-RNTI), or the like of the terminal.

If the terminal is in an idle (idle) state, the identifier of the terminal may be at least one of an international mobile subscriber identity (IMSI), a system architecture evolution temporary mobile subscriber identity (S-TMSI), or related information (for example, IMSI mod 1024) based on the IMSI or the S-TMSI.

Before determining the index of the first subband based on the identifier of the terminal and the subband quantity of the system bandwidth, the terminal may determine the subband quantity of the system bandwidth first.

An implementation in which the terminal determines the subband quantity of the system bandwidth may include the following. The terminal receives the configuration information of the first subband, where the configuration information of the first subband includes the subband quantity of the system bandwidth.

Various configuration information of the first subband in this embodiment of this application may be sent by using a system message.

The following describes possible specific implementations when the terminal determines a bandwidth of a subband.

Implementations in which the terminal determines the bandwidth of the first subband may be divided into different cases depending on whether subbands of the system bandwidth have equal bandwidths (in other words, whether bandwidths of subbands obtained after the system bandwidth is divided are the same).

If the subbands of the system bandwidth have equal bandwidths, the implementation in which the terminal determines the bandwidth of the first subband may include the following. The terminal receives the configuration information of the first subband, where the configuration information of the first subband includes the subband quantity of the system bandwidth, and the terminal determines the bandwidth of the first subband based on the system bandwidth and the subband quantity of the system bandwidth. For example, the terminal may divide the system bandwidth by the subband quantity, and an obtained result may be used as the bandwidth of the first subband.

Alternatively, if the subbands of the system bandwidth have equal bandwidths, the implementation in which the terminal determines the bandwidth of the first subband may include the following. The terminal receives the configuration information of the first subband, where the configuration information of the first subband includes a subband bandwidth of the system bandwidth, and the terminal determines the subband bandwidth included in the configuration information of the first subband as the bandwidth of the first subband.

If the subbands of the system bandwidth do not have equal bandwidths, the implementation in which the terminal determines the bandwidth of the first subband may include the following. The terminal receives the configuration information of the first subband, where the configuration information of the first subband includes bandwidths of a plurality of subbands of the system bandwidth, and sequence numbers of the plurality of subbands correspond to indexes of the subbands. The terminal determines the index of the first subband based on the identifier of the terminal and a quantity of the plurality of subbands, and the obtained index of the first subband may indicate a location of the first subband in the plurality of subbands in the configuration information of the first subband, so that the bandwidth of the first subband can be determined.

For example, if the system bandwidth is 100 M, and the frequency band is 850 M to 950 M, bandwidths of a plurality of subbands indicated by the configuration information of first subband in descending order are 10 M, 20 M, 5 M, 30 M, 15 M, and 20 M respectively. After receiving the configuration information of the first subband, the terminal may confirm that the subband quantity is 6, and confirm that an index indicating that the subband bandwidth is 10 M is 0, and so on. When determining, based on the identifier of the terminal and the subband quantity, that the index of the first subband is 1, the terminal confirms that a subband having a subband bandwidth of 20 M is the first subband, and the frequency band of the first subband is 920 M to 940 M. It may be understood that the configuration information of the first subband includes bandwidths of a plurality of subbands of the system bandwidth, and the bandwidths may be indicated in descending or ascending order of frequencies of the subbands. A specific indication manner may be predefined in a protocol or indicated by the network device to the terminal. This is not limited in this embodiment of this application.

If the subbands of the system bandwidth do not have equal bandwidths, the implementation in which the terminal determines the bandwidth of the first subband may include the following. The terminal receives the configuration information of the first subband, where the configuration information of the first subband includes bandwidths of a plurality of subbands of the system bandwidth and indexes of the plurality of subbands. The terminal determines the index of the first subband based on the identifier of the terminal and a quantity of the plurality of subbands. The terminal determines, based on the index of the first subband and a correspondence between the bandwidths of the plurality of subbands in the configuration information of the first subband and the indexes of the plurality of subbands, the bandwidth of the first subband from the bandwidths of the plurality of subbands included in the configuration information of the first subband. For the implementation in which the terminal determines the index of the first subband based on the identifier of the terminal and the quantity of the plurality of subbands, refer to the foregoing implementations.

For example, the system bandwidth is 100 M, and the frequency band is 850 M to 950 M. Bandwidths, of a plurality of subbands, indicated by the configuration information of the first subband in descending order and indexes of the plurality of subbands are 10 M and index 0, 20 M and index 1, 5 M and index 2, 30 M and index 3, 15 M and index 4, and 20 M and index 5 respectively. After receiving the configuration information of the first subband, the terminal may confirm that the subband quantity is 6. When determining, based on the identifier of the terminal and the subband quantity, that the index of the first subband is 1, the terminal confirms, based on indexes of subbands, that a subband having an index of 1 and a bandwidth of 20 M is the first subband, and confirms that the frequency band of the first subband is 920 M to 940 M. It may be understood that the configuration information of the first subband includes bandwidths of a plurality of subbands of the system bandwidth, and the bandwidths may be indicated in descending or ascending order of frequencies of the subbands. A specific indication manner may be predefined in a protocol or indicated by the network device to the terminal. This is not limited in this application.

S220. The terminal receives the first downlink control information on the first subband.

Because the bandwidth of the first subband is less than the system bandwidth, the terminal may receive the first downlink control information in a frequency band with a smaller bandwidth, thereby reducing the bandwidth used by the terminal to receive the first downlink control information and further reducing energy consumption of the terminal.

That the terminal receives the first downlink control information on the first subband may include the following. The terminal determines, based on the bandwidth of the first subband, a first search space for receiving the first downlink control information on the first subband, and the terminal receives the first downlink control information in the first search space. For a manner of obtaining the bandwidth of the first subband, refer to a related operation in S210.

That the terminal determines, based on the bandwidth of the first subband, a first search space for receiving the first downlink control information on the first subband may include the following. The terminal determines, based on the bandwidth of the first subband, a location, of the first search space for receiving the first downlink control information, on the first subband. For example, the terminal calculates a start location of the first search space on the first subband and/or a time-frequency location of the search space based on the bandwidth of the first subband.

Specifically, the terminal may determine a quantity of frequency domain resources of the first search space based on the bandwidth of the first subband and a subcarrier spacing or a physical resource block of the first subband. Further, the terminal may further determine a first search space on a corresponding time-frequency resource with reference to time domain information of the first search space.

The following describes content of the first downlink control information.

From one aspect, the first downlink control information may include first instruction information, and the first instruction information is used to instruct the terminal to receive a paging message, a system message, a random access response message, or another downlink response message.

That the first downlink control information includes first instruction information may mean that the first instruction information is carried in the first downlink control information, or may mean that the first instruction information is used as a scrambling parameter of the first downlink control information.

The first instruction information may include at least one of the following information: a paging radio network temporary identity (P-RNTI), system message reading instruction information, a random access radio network temporary identity (RA-RNTI), the identifier of the terminal, and the like.

Further, if the terminal receives or detects the first instruction information in the first downlink control information, the terminal receives at least one of a paging message, a system message, a random access response message, another downlink response message, and a radio resource control (RRC) message on the first subband according to the first instruction information.

Further, the terminal may obtain, based on the identifier of the terminal, time domain information used by the terminal to receive a paging message, a system message, a random access response message, or another downlink response message. For example, the terminal may calculate a paging frame (PF) and a paging occasion (PO) of the terminal by using the identifier of the terminal, and receive a paging message, a system message, a random access response, another downlink response message, or a radio resource control message on a PO in the frequency band of the first subband. This embodiment of this application does not limit a manner in which the terminal determines the time domain information.

For example, in a high-frequency cell using a plurality of beams, after calculating the PF and the PO, the terminal may further combine with a beam scanning period of the high-frequency cell to finally determine a paging receiving time of the terminal in time domain. The beam scanning period may be a time required by the plurality of beams in the high-frequency cell to sweep over the entire cell. The plurality of beams may be analog beams or hybrid beams formed by the terminal at different times. The high-frequency cell is a cell having an operating frequency band of 3 GHz and/or above and configured with a plurality of beams. To ensure coverage of the entire cell, the plurality of beams need to perform beam scanning.

Specifically, the terminal may start a timer by using the PF or the PO as a start time, and then keeps listening for a paging message within a running time of the timer. Duration of the timer may be a time of the beam scanning period.

If the terminal obtains a paging message through listening, the terminal may stop the timer, and receive the paging message according to a first instruction information in the first downlink control information.

It may be understood that the terminal may listen for the paging message within a scanning time of a detected service beam based on detected service beam information, such as a service beam identifier. In this way, more power of the terminal can be saved.

A beam identifier may be at least one of the following beam identifier information: an identifier of a beam, an index of the beam, an antenna port identifier of the beam, a reference signal of the beam, and the like.

Optionally, the terminal may further determine a PF and/or a PO of the terminal under each beam with reference to the beam identifier, so that the terminal can confirm, based on the detected service beam information, a downlink service beam identifier for example, and then receive a paging message on the PF and/or the PO corresponding to the detected service beam.

A method for calculating a paging receiving time by the terminal in the high-frequency cell in this embodiment of this application is not limited to the foregoing technical solution, or may be another paging monitoring mechanism based on a PF and/or a PO and combined with a beam scanning period.

From another aspect, the first downlink control information may include location indication information, and the location indication information may be used to indicate information about a location at which the terminal receives at least one of a paging message, a system message, a random access response message, and another downlink response message or a radio resource control message. In this way, the terminal may directly receive at least one of the paging message, the system message, the random access response message, the another downlink response message, and the radio resource control message according to the location indication information.

The location indication information may include a time domain location and/or a frequency domain location of the at least one message. Further, the location indication information may indicate that the time domain location and/or the frequency domain location are/is on the first subband.

On the first subband, the terminal may receive at least one of the paging message, the system message, the random access response message, the another downlink response message, and the radio resource control message at a time domain location and/or a frequency domain location indicated by the location indication information.

It should be understood that the first downlink control information may include both the first instruction information and the location indication information.

The following describes another possible implementation in which the terminal determines the first subband on which the first downlink control information is located in S210.

In this embodiment of this application, the terminal may receive a paging message, a system message, a random access response message, another downlink response message, or a radio resource control message. The paging message, the system message, the random access response message, the another downlink response message, or the radio resource control message may carry configuration information of the first subband, and the configuration information of first subband is used to indicate the first subband on which the terminal receives the first downlink control information. The terminal may determine the first subband based on the configuration information of the first subband.

For example, the current terminal may currently receive a paging message, a system message, a random access response message, another downlink response message, or a radio resource control message on the system bandwidth or a second subband. The paging message, the system message, the random access response message, the another downlink response message, or the radio resource control message may carry the configuration information of the first subband. The configuration information of the first subband carries the first subband on which the terminal receives the first downlink control information. In this way, the terminal may receive next first downlink control information on the first subband, and may receive, on the first subband, a paging message, a system message, a random access response message, another downlink response message, or a radio resource control message indicated by the next first downlink control information.

The second subband may be determined by the terminal based on the foregoing implementations of determining the first subband.

In this possible implementation, the configuration information of the first subband may further carry timer information. After receiving the configuration information of the first subband, the terminal starts a timer, and the terminal receives the first downlink control information and/or the paging message, the system message, the random access response message, or the another downlink response message on the first subband within a running time of the timer.

If the timer expires, that is, the timer exceeds a time period indicated by the timer, the terminal may re-determine, by using the foregoing first possible implementation of determining the first subband, a subband for receiving the first downlink control information, and receive the first downlink control information and/or the paging message, the system message, the random access response message, or the another downlink response message on the re-determined subband, or the terminal may receive the first downlink control information and/or the paging message, the system message, the random access response message, or the another downlink response message on the system bandwidth.

In this possible implementation, the first subband may be a dedicated subband of the terminal. That is, the terminal may receive the first downlink control information and/or receive the paging message, the system message, the random access response message, or the another downlink response message on a dedicated subband indicated by the configuration information of the first subband.

For example, before the terminal in an active state enters an idle state or an inactive state, received state switching signaling may carry the configuration information of the first subband. The configuration information of the first subband indicates the dedicated subband on which the terminal receives the first downlink control information within the time period indicated by the timer. In this way, after entering the idle state or the inactive state, the terminal may receive the first downlink control information and/or receive the paging message, the system message, the random access response message, or the another downlink response message on the dedicated subband within the time period indicated by the timer and according to an indication of the configuration information of the first subband.

Figure 4:
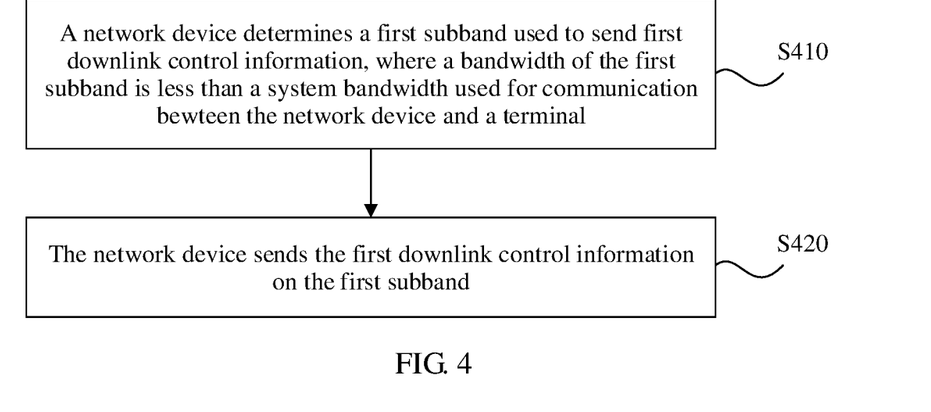
FIG. 4 is a schematic flowchart of a communication method according to another embodiment of this application.

FIG. 4 is a schematic flowchart of a communication method according to another embodiment of this application. It should be understood that FIG. 4 shows steps or operations of the communication method, but these steps or operations are merely examples. In this embodiment of this application, other operations or variations of the operations in FIG. 4 may be further performed. In addition, the steps in FIG. 4 may be performed in a sequence different from that shown in FIG. 4, and it is possible that not all of the operations in FIG. 4 need to be performed.

S410. A network device determines a first subband used to send first downlink control information, where a bandwidth of the first subband is less than a system bandwidth used for communication between the network device and a terminal.

S420. The network device sends the first downlink control information on the first subband.

In this communication method, a radio access network sends the first downlink control information on a subband. Compared with the prior art in which a network device sends downlink control information in a system bandwidth, a bandwidth for transmitting the first downlink control information may be reduced, thereby reducing energy consumed for receiving the first downlink control information by the terminal.

In addition, the network device sends the downlink control information on the subband, so that a terminal that cannot communicate by using the system bandwidth can also receive the downlink control information on the subband.

In addition, the network device sends the downlink control information on the subband, so that the network device can send the downlink control information on a plurality of subbands on a same time domain resource. For example, because of a capacity of the downlink control information, a paging message, a random access response message, a system message, or a radio resource control message, regardless of a size of a bandwidth, a maximum quantity of terminals that can be carried by the message does not change. In this case, a relatively small bandwidth that can guarantee a maximum capacity of the message is selected. Conventionally, the downlink control information, the paging message, the random access response message, the another downlink response message, or the radio resource control message is sent on a full bandwidth. In comparison, the network device in this embodiment of this application may send the downlink control information to more terminals on a same time domain resource.

Figure 5:
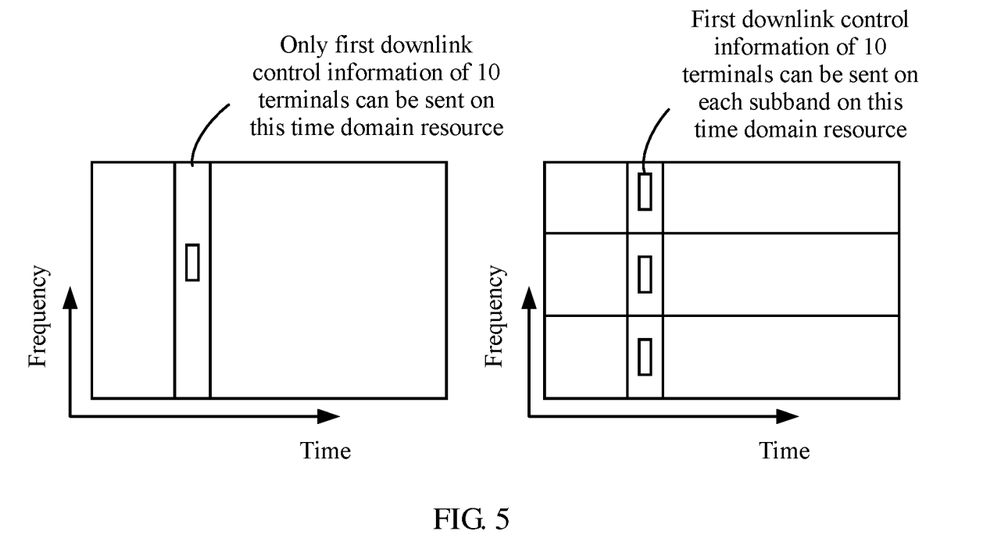
FIG. 5 is a schematic diagram of a spectrum of a first subband according to another embodiment of this application.

As shown in a figure on the left in FIG. 5, in a conventional method for sending a paging message on a full bandwidth, because a size of the paging message is limited, and one paging moment has only one paging message, for example, one paging message may carry information about up to 10 terminals, the paging message can only carry information about 10 terminals for paging even if the network device sends the paging message on a full bandwidth at a paging moment. However, as shown in a figure on the right in FIG. 5, in the method for sending a paging message on a subband in this embodiment of this application, if a maximum paging message may be sent on a time-frequency resource on each subband, downlink control information of 30 terminals may be sent on a same time-domain resource.

For specific implementations of S410 and S420, refer to the specific implementations of S210 and S220 respectively. To be specific, a manner in which the network device determines the first subband used to send the first downlink control information is the same as the manner in which the terminal determines the first subband used to receive the first downlink control information. The manner, specifically described in S210, in which the terminal determines the first subband, is also applicable to the network device. That is, the implementations in S210 and S220 are performed by the terminal, and the same implementations in S410 and S420 are performed by the network device. In addition, when sending first downlink control information, the network device may also determine, based on the bandwidth of the first subband, a first search space for sending the first downlink control information on the first subband. For a specific manner of determining the first search space, refer to related descriptions in the method embodiment shown in FIG. 2. For brevity, details are not described herein again.

Figure 6:
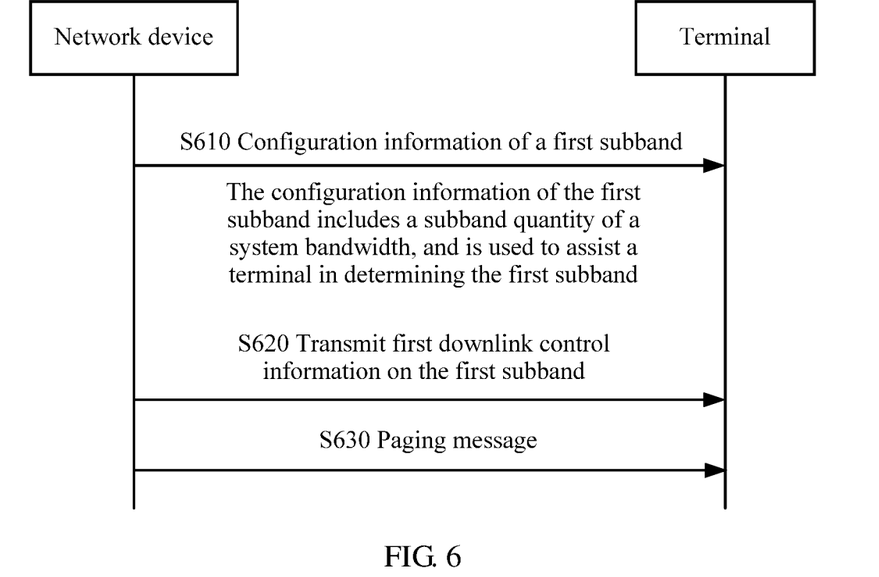
FIG. 6 is a schematic flowchart of a communication method according to another embodiment of this application.

With reference to FIG. 6, the following describes in more detail a specific embodiment of the communication method shown in FIG. 2 and FIG. 4. It should be understood that FIG. 6 shows steps or operations of the communication method, but these steps or operations are merely examples. In this embodiment of this application, other operations or variations of the operations in FIG. 6 may be further performed. In addition, the steps in FIG. 6 may be performed in a sequence different from that shown in FIG. 6, and it is possible that not all of the operations in FIG. 6 need to be performed.

S610. A network device sends configuration information of a first subband, where the configuration information of the first subband includes a subband quantity of a system bandwidth. The configuration information of the first subband is used to assist a terminal in determining the first subband. Correspondingly, the terminal receives the configuration information of the first subband.

The network device may send the configuration information of the first subband in a system message. Correspondingly, the terminal receives the configuration information of the first subband in the system message.

S620. The network device sends the first downlink control information on the first subband, where the first subband is less than a system bandwidth used for communication between the network device and the terminal. Correspondingly, the terminal receives the first downlink control information on the first subband.

The following first describes in detail a specific implementation in which the network device sends the first downlink control information on the first subband.

The network device takes an obtained modulus value after an identifier of the terminal mod the subband quantity, as an index of the first subband.

The network device divides the system bandwidth by the subband quantity to obtain a bandwidth of the first subband.

The network device determines a frequency band of the first subband based on the index of the first subband and the bandwidth of the first subband.

It should be understood that before this, the network device has learned of a frequency band of the system bandwidth.

If the terminal is in an inactive state, namely, a third state, or in an active state, the identifier of the terminal may be at least one of an RAN resume ID, a DCID, a C-RNTI, a TC-RNTI, or the like of the terminal.

If the terminal is in an idle state, the identifier of the terminal may be at least one of an IMSI or an S-TMSI of the terminal received by the network device from a core network device, or related information (such as IMSI mod 1024) based on the IMSI or the S-TMSI, or another identifier.

The network device divides the system bandwidth by the subband quantity to obtain the bandwidth of the first subband.

The network device may obtain, based on the bandwidth of the first subband, a first search space for sending the first downlink control information on the first subband.

The network device sends the first downlink control information in the first search space of a downlink control channel of the first subband.

The following describes in detail a specific implementation in which the terminal receives the first downlink control information on the first subband.

The terminal takes an obtained modulus value after the identifier of the terminal mod the subband quantity, as the index of the first subband.

The terminal divides the system bandwidth by the subband quantity to obtain the bandwidth of the first subband.

The terminal determines the frequency band of the first subband based on the index of the first subband and the bandwidth of the first subband.

It should be understood that before this, the terminal has learned of the frequency band of the system bandwidth and the identifier of the terminal.

If the terminal is in an inactive state, namely, a third state, or in an active state, the identifier of the terminal may be at least one of an RAN resume ID, a DCID, a C-RNTI, a TC-RNTI, or the like of the terminal.

If the terminal is in an idle state, the identifier of the terminal may be at least one of an IMSI or an S-TMSI of the terminal, related information (such as IMSI mod 1024) based on the IMSI or the S-TMSI, or another identifier.

The terminal divides the system bandwidth by the subband quantity to obtain the bandwidth of the first subband.

The terminal may obtain, based on the bandwidth of the first subband, the first search space for receiving the first downlink control information on the first subband.

The terminal receives the first downlink control information in the first search space of the downlink control channel of the first subband.

Figure 7:
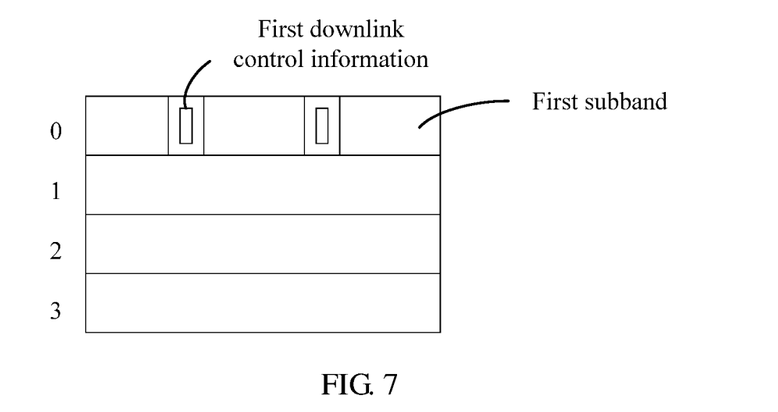
FIG. 7 is a schematic diagram of a spectrum of a first subband according to another embodiment of this application.

As shown in FIG. 7, the system bandwidth is divided into four subbands, and indexes are 0, 1, 2, and 3 respectively. After the network device obtains, based on the identifier of the terminal and the subband quantity, that the index of the first subband is 0, the network device may send the first downlink control information on the subband with the index of 0. Correspondingly, the terminal may calculate, based on the identifier of the terminal and the subband quantity, that the index of the first subband is 0, and then receive the first downlink control information on the subband with the index of 0.

In S620, the first downlink control information may include first instruction information, and the first instruction information is used to instruct the terminal to receive at least one of a paging message, a system message, a random access response message, another downlink response message, or a radio resource control message.

If the terminal receives or detects the first instruction information in the first downlink control information, the terminal receives at least one of the paging message, the system message, the random access response message, the another downlink response message, and the radio resource control message on the first subband according to the first instruction information.

The first downlink control information may further carry location indication information, and the location indication information may be used to indicate information about a location at which the terminal receives at least one of the paging message, the system message, the random access response message, the another downlink response message, the radio resource control message, and the like.

S630. The terminal may obtain, based on an identifier of the terminal, time domain information for receiving a paging message, a system message, a random access response message, or another downlink response message by the terminal. For example, the terminal may calculate a paging frame and a paging occasion of the terminal by using the identifier of the terminal, and receive the paging message, the system message, the random access response, the another downlink response message, or the radio resource control message on a PO in a frequency band of the first subband. This embodiment of this application does not limit a manner in which the terminal determines the time domain information.

In the communication method shown in FIG. 6, optionally, a subband bandwidth may be configured on the network device. In this case, in S610, the configuration information of the first subband may include a subband bandwidth of the system bandwidth. The network device or the terminal may divide the system bandwidth by the subband bandwidth to obtain the subband quantity, and may determine the subband bandwidth in the configuration information of the first subband as the bandwidth of the first subband, and then the operation in S620 is performed.

In the communication method shown in FIG. 6, optionally, bandwidths of a plurality of subbands of the system bandwidth may not be equal, the network device may be configured with the bandwidths of the plurality of subbands, and an index of each subband in the plurality of subbands is a ranking of each subband in the plurality of subbands. In this case, in S610, the configuration information of the first subband may include the bandwidths of the plurality of subbands of the system bandwidth. The network device and the terminal may perform a same operation as that in S620.

However, a manner in which the network device or the terminal determines the subband quantity of the system bandwidth may be as follows. The network device or the terminal uses a quantity of the plurality of subbands as the subband quantity of the system bandwidth. In addition, a manner in which the network device or the terminal obtains the bandwidth of the first subband may be as follows. The network device or the terminal searches, based on the index of the first subband, for the bandwidth of the first subband from the bandwidths, of the plurality of subbands, indicated by the configuration information of first subband.

The following describes the communication method in this embodiment of this application in more detail by using an example in which the first downlink control information includes the first instruction information used to instruct the terminal to receive the paging message.

It is assumed that the frequency band used for communication between the network device and the terminal is 890 M to 910 M, the system bandwidth is 20 M and is evenly divided into four subbands, the subbands are sorted in descending order of frequencies, and implicit indexes of the subbands are successively increased by 1 starting from 0 according to a sorting sequence of the subbands. It may be understood that the subbands may be alternatively sorted in ascending order of frequencies. This is not limited in this application.

The terminal receives the configuration information of the first subband, and the configuration information of the first subband includes a subband quantity 4.

The terminal obtains through calculation that the index of the first subband is 1 according to a formula: terminal identifier mod 4. In addition, the terminal may divide the system bandwidth 20 M by the subband quantity 4 to obtain a subband bandwidth 5 M.

The terminal may obtain through calculation that the frequency band of the first subband is 900 M to 905 M based on the system frequency band 890 M to 910 M, the subband bandwidth 5 M, and the index 1 of the first subband.

Further, the terminal determines a search space location of the terminal in the frequency band of the first subband. Optionally, the terminal may determine the search space location based on the bandwidth of the first subband.

The terminal detects the first downlink control information in a search space in the frequency band of the first subband.

If the terminal detects the first instruction information from the first downlink control information and the first instruction information includes a P-RNTI, the terminal determines, according to the first instruction information, to receive the paging message on the first subband. Further, the terminal may calculate a PF and a PO based on the identifier of the terminal, and receives the paging message on the PO in the frequency band of the first subband.

Further, the first downlink control information may further include location indication information, and the location indication information indicates a frequency domain location at which the terminal receives the paging message. If the frequency domain location indicated by the location indication information is 900 M to 902 M, the terminal may receive the paging message in a frequency band of 900 M to 902 M and on the calculated PO.

The following describes the terminal and the network device in the embodiments of this application with reference to FIG. 8 to FIG. 11.

Figure 8:
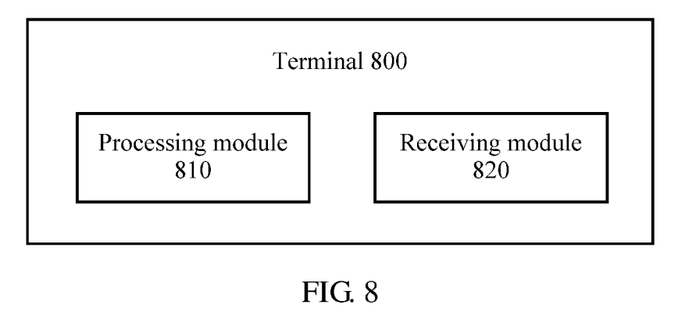
FIG. 8 is a schematic structural diagram of a terminal according to an embodiment of this application.

FIG. 8 is a schematic structural diagram of a terminal according to an embodiment of this application. It should be understood that a terminal 800 shown in FIG. 8 is merely an example. The terminal in this embodiment of this application may further include another module or unit, or include modules having functions similar to those of the modules in FIG. 8, or does not need to include all the modules in FIG. 8.

A processing module 810 is configured to determine a first subband on which first downlink control information is located, where a bandwidth of the first subband is less than a system bandwidth used for communication between a network device and the terminal.

A receiving module 820 is configured to receive the first downlink control information on the first subband.

A bandwidth of a subband used by the terminal to receive the first downlink control information is less than the system bandwidth, so that the terminal can receive the first downlink control information in a frequency band with a smaller bandwidth, thereby reducing an operating bandwidth used by the terminal to receive the first downlink control information, and further reducing energy consumption of the terminal.

Optionally, the processing module may be specifically configured to determine, based on an index of the first subband, a frequency band on which the first subband is located.

Optionally, the receiving module may be further configured to receive configuration information of the first subband, where the configuration information of the first subband includes a subband quantity of the system bandwidth. The processing module may be further configured to determine the index of the first subband based on an identifier of the terminal and the subband quantity, determine the bandwidth of the first subband based on the system bandwidth and the subband quantity, and determine the frequency band of the first subband based on the index of the first subband and the bandwidth of the first subband.

Optionally, the receiving module is further configured to receive configuration information of the first subband, where the configuration information of the first subband includes a subband bandwidth of the system bandwidth. The processing module is further configured to determine a subband quantity of the system bandwidth based on the system bandwidth and the subband bandwidth, and determine the index of the first subband based on the subband quantity and the identifier of the terminal.

Optionally, the processing module is further configured to determine, based on the bandwidth of the first subband, a first search space for receiving the first downlink control information on the first subband. The receiving module is specifically configured to receive the first downlink control information in the first search space.

Optionally, the first downlink control information includes first instruction information, and the first instruction information is used to instruct the terminal to receive at least one of the following messages: a paging message, a system message, or a random access response message.

Optionally, the first downlink control information may further include location indication information, and the location indication information is used to indicate a time domain location and/or a frequency domain location of the at least one message on the first subband.

Optionally, the receiving module is further configured to receive a paging message, a system message, a radio resource control message, or a random access response message, where the paging message, the system message, the radio resource control message, or the random access response message carries configuration information of the first subband, the configuration information of the first subband is used to instruct the terminal to receive the first downlink control information on the first subband, and the processing module is specifically configured to determine, based on the configuration information of the first subband, the first subband on which the first downlink control information is located.

It should be understood that the foregoing and other operations and/or functions of units of the terminal in this embodiment of this application shown in FIG. 8 are separately used to implement corresponding procedures of the communication method in FIG. 2. For brevity, details are not described herein again.

Figure 9:
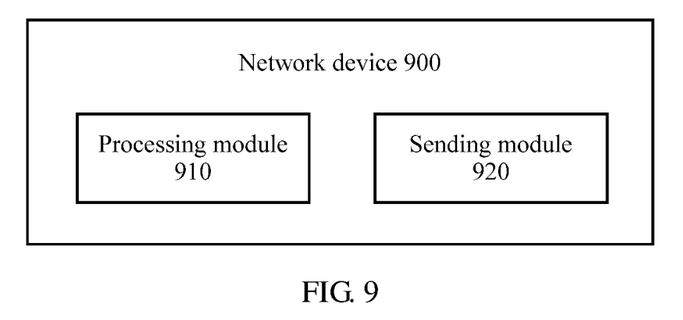
FIG. 9 is a schematic structural diagram of a network device according to an embodiment of this application.

FIG. 9 is a schematic structural diagram of a network device according to an embodiment of this application. It should be understood that a network device 900 shown in FIG. 9 is merely an example. The network device in this embodiment of this application may further include another module or unit, or include modules having functions similar to those of the modules in FIG. 9, or does not need to include all the modules in FIG. 9.

A processing module 910 is configured to determine a first subband on which first downlink control information is located, where a bandwidth of the first subband is less than a system bandwidth used for communication between the network device and a terminal.

A sending module 920 is configured to send the first downlink control information on the first subband.

A bandwidth of a subband used by the network device to send the first downlink control information is less than the system bandwidth, so that the terminal can receive the first downlink control information in a frequency band with a smaller bandwidth, thereby reducing time used by the terminal to receive the first downlink control information, and further reducing energy consumption of the terminal.

Optionally, the processing module may be specifically configured to determine, based on an index of the first subband, a frequency band on which the first subband is located.

Optionally, the sending module may be further configured to send configuration information of the first subband, where the configuration information of the first subband includes a subband quantity of the system bandwidth.

Optionally, the sending module may be further configured to send configuration information of the first subband, where the configuration information of the first subband includes a subband bandwidth of the system bandwidth.

Optionally, the processing module may be further configured to determine, based on the bandwidth of the first subband, a first search space for sending the first downlink control information on the first subband. The sending module may be specifically configured to send the first downlink control information in the first search space.

Optionally, the first downlink control information includes first instruction information, and the first instruction information is used to instruct the terminal to receive at least one of the following messages: a paging message, a system message, or a random access response message.

Optionally, the first downlink control information may further include location indication information, and the location indication information is used to indicate a time domain location and/or a frequency domain location of the at least one message on the first subband.

Optionally, the sending module may be further configured to send a paging message, a system message, a radio resource control message, or a random access response message, where the paging message, the system message, the radio resource control message, or the random access response message carries configuration information of the first subband, and the configuration information of the first subband is used to instruct the terminal to receive the first downlink control information on the first subband.

It should be understood that the foregoing and other operations and/or functions of units of the network device in this embodiment of this application shown in FIG. 9 are separately used to implement corresponding procedures of the communication method in FIG. 4. For brevity, details are not described herein again.

Figure 10:
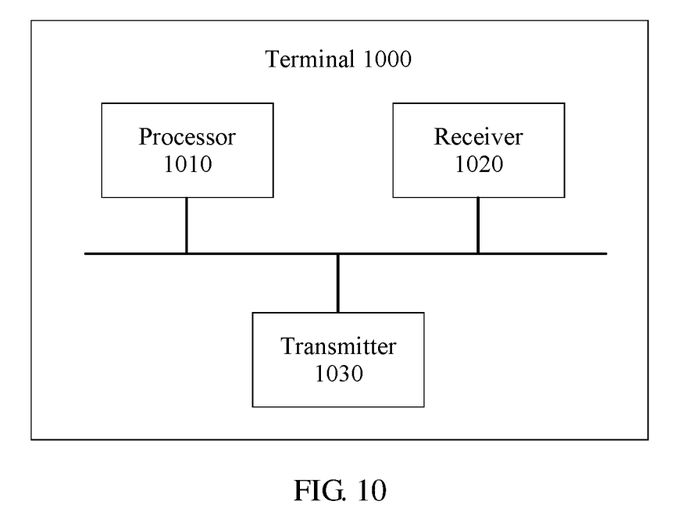
FIG. 10 is a schematic structural diagram of a terminal according to another embodiment of this application.

FIG. 10 is a schematic structural diagram of a terminal 1000 according to another embodiment of this application. It should be understood that the terminal shown in FIG. 10 is merely an example. The terminal in this embodiment of this application may further include another module or unit, or include modules having functions similar to those of the modules in FIG. 10, or does not need to include all the modules in FIG. 10.

A processor 1010 may be configured to perform steps or operations that can be performed by the processing module 810 in FIG. 8, and a receiver 1020 may be configured to perform steps or operations that can be performed by the receiving module 820 in FIG. 8. For brevity, details are not described herein.

Optionally, the terminal 1000 may further include a transmitter 1030. The transmitter 1030 may be configured to send a message to another device or network element.

It may be understood that the receiver 1020 and the transmitter 1030 may exist independently, or may be integrated together, which is referred to as a transceiver.

Figure 11:
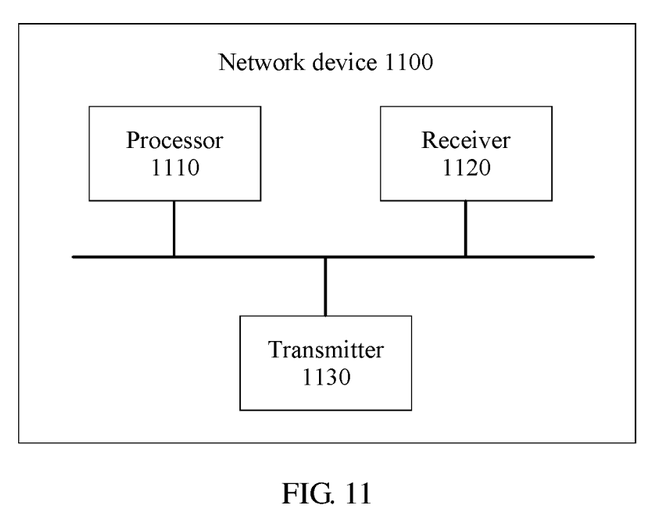
FIG. 11 is a schematic structural diagram of a network device according to another embodiment of this application.

FIG. 11 is a schematic structural diagram of a network device 1100 according to another embodiment of this application. It should be understood that the network device shown in FIG. 11 is merely an example. The network device in this embodiment of this application may further include another module or unit, or include modules having functions similar to those of the modules in FIG. 11, or does not need to include all the modules in FIG. 11.

A processor 1110 may be configured to perform steps or operations that can be performed by the processing module 910 in FIG. 9, and a transmitter 1130 may be configured to perform steps or operations that can be performed by the sending module 930 in FIG. 9. For brevity, details are not described herein.

Optionally, the network device 1100 may further include a receiver 1120. The receiver 1120 may be configured to receive a message sent by another device or network element.

It may be understood that the receiver 1120 and the transmitter 1130 may exist independently, or may be integrated together, which is referred to as a transceiver.

A person of ordinary skill in the art may be aware that, in combination with the examples described in the embodiments disclosed in this specification, all or some of units and algorithm steps may be implemented by using software, hardware, firmware, or any combination thereof. Whether the functions are performed by hardware or software depends on particular applications and design constraint conditions of the technical solutions. A person skilled in the art may use different methods to implement the described functions for each particular application, but it should not be considered that the implementation goes beyond the scope of this application. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are completely or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk), or the like.

It may be clearly understood by a person skilled in the art that, for the purpose of convenient and brief description, a detailed working process of the foregoing system, apparatus, and unit may refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division, and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by a terminal, a first subband on which first downlink control information is located, wherein a bandwidth of the first subband is less than a system bandwidth used for communication between a network device and the terminal; and
   receiving, by the terminal, the first downlink control information on the first subband, wherein the receiving the first downlink control information comprises:
      determining, by the terminal, a first search space that is within the first subband and that is for receiving the first downlink control information on the first subband, wherein the first search space has a size that is smaller than a size of the first subband; and
      receiving, by the terminal, the first downlink control information in the first search space;
   wherein the first downlink control information comprises first indication information that indicates to the terminal to receive a paging message, and further comprises location indication information that indicates at least one of a time domain location or a frequency domain location of the paging message on the first subband.

2. The communication method according to claim 1, wherein the determining the first subband comprises:
   determining, by the terminal, a frequency band of the first subband according to an index of the first subband.

3. The communication method according to claim 2, further comprising:
   receiving, by the terminal, configuration information of the first subband, wherein the configuration information of the first subband comprises a subband quantity of the system bandwidth; and
   determining, by the terminal, the index of the first subband according to an identifier of the terminal and the subband quantity.

4. The communication method according to claim 2, further comprising:
   receiving, by the terminal, configuration information of the first subband, wherein the configuration information of the first subband comprises a subband bandwidth of the system bandwidth;
   wherein the determining the index of the first subband comprises:
      determining, by the terminal, a subband quantity of the system bandwidth according to the system bandwidth and the subband bandwidth; and
      determining, by the terminal, the index of the first subband according to an identifier of the terminal and the subband quantity.

5. The communication method according to claim 1, wherein determining the first search space comprises:
   determining, by the terminal based on the bandwidth of the first subband, the first search space.

6. The communication method according to claim 1, further comprising:

receiving, by the terminal, at least one of a paging message, a system message, a radio resource control message, or a random access response message, wherein the at least one of the paging message, the system message, the radio resource control message, or the random access response message carries configuration information of the first subband, and wherein the configuration information of the first subband indicates, to the terminal, to receive the first downlink control information on the first subband; and wherein the determining the first subband comprises:
determining, by the terminal, an index of the first subband according to the configuration information of the first subband.

7. An apparatus, comprising:
first circuitry configured to:
determine a first subband on which first downlink control information is located, wherein a bandwidth of the first subband is less than a system bandwidth used for communication between a network device and the apparatus, wherein the first circuitry being configured to determine the first subband comprises the first circuitry being configured to determine a first search space for receiving the first downlink control information on the first subband, and wherein the first search space has a size that is smaller than a size of the first subband; and
second circuitry configured to:
receive the first downlink control information on the first subband;
wherein the first downlink control information comprises first indication information that indicates to the apparatus to receive a paging message, and further comprises location indication information that indicates at least one of a time domain location or a frequency domain location of the paging message on the first subband in the first search space.

8. The apparatus according to claim 7, wherein the first circuitry is configured to determine, according to an index of the first subband, a frequency band on which the first subband is located.

9. The apparatus according to claim 8, wherein the second circuitry is further configured to receive configuration information of the first subband, wherein the configuration information of the first subband comprises a subband quantity of the system bandwidth; and
wherein the first circuitry is further configured to determine the index of the first subband according to an identifier of the apparatus and the subband quantity.

10. The apparatus according to claim 8, wherein the second circuitry is further configured to receive configuration information of the first subband, wherein the configuration information of the first subband comprises a subband bandwidth of the system bandwidth; and
wherein the first circuitry is further configured to determine a subband quantity of the system bandwidth according to the system bandwidth and the subband bandwidth, and to determine the index of the first subband according to an identifier of the apparatus and the subband quantity.

11. The apparatus according to claim 7, wherein the first circuitry being configured to determine the first search space for receiving the first downlink control information on the first subband comprises the first circuitry being configured to determine, according to the bandwidth of the first subband, the first search space.

12. The apparatus according to claim 7, wherein the second circuitry is further configured to receive at least one of a paging message, a system message, a radio resource control message, or a random access response message, wherein the at least one of the paging message, the system message, the radio resource control message, or the random access response message carries configuration information of the first subband, and wherein the configuration information of the first subband indicates, to the apparatus, to receive the first downlink control information on the first subband; and
wherein the first circuitry is configured to determine, according to the configuration information of the first subband, an index of the first subband.

13. An apparatus, comprising:
first circuitry configured to:
determine a first subband on which first downlink control information is located, wherein a bandwidth of the first subband is less than a system bandwidth used for communication between the apparatus and a terminal, wherein the first circuitry being configured to determine the first subband comprises the first circuitry being configured to:
determine a first search space that is within the first subband and that is for sending the first downlink control information on the first subband, wherein the first search space has a size that is smaller than a size of the first subband; and
send the first downlink control information in the first search space; and
second circuitry configured to:
send the first downlink control information on the first subband in the first search space;
wherein the first downlink control information comprises first indication information that indicates to the terminal to receive a paging message, and further comprises location indication information that indicates at least one of a time domain location or a frequency domain location of the paging message on the first subband.

14. The apparatus according to claim 13, wherein the second circuit is further configured to send configuration information of the first subband, wherein the configuration information of the first subband comprises a subband bandwidth of the system bandwidth.

15. The apparatus according to claim 13, wherein the second circuit is further configured to send at least one of a paging message, a system message, a radio resource control message, or a random access response message;
wherein the at least one of the paging message, the system message, the radio resource control message, or the random access response message carries configuration information of the first subband, and wherein the configuration information of the first subband is used to indicate the terminal to receive the first downlink control information on the first subband.

16. The apparatus according to claim 13, wherein the first indication information includes at least one of a paging radio network temporary identity (P-RNTI) or an identifier of the terminal.

17. The apparatus according to claim 13, wherein the first circuitry being configured to determine the first search space comprises the second circuit being configured to:
determine, based on the bandwidth of the first subband, the first search space for sending the first downlink control information on the first subband.

* * * * *